(12) United States Patent
Hatlelid et al.

(10) Patent No.: US 7,426,718 B2
(45) Date of Patent: Sep. 16, 2008

(54) OVERRIDING CONSTRUCTORS TO PROVIDE NOTIFICATION IN ORDER TO DETECT FOREIGN CODE

(75) Inventors: Kristjan E. Hatlelid, Sammamish, WA (US); Uri London, Redmond, WA (US); Vladimir A. Shubin, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 641 days.

(21) Appl. No.: 11/086,961

(22) Filed: Mar. 21, 2005

(65) Prior Publication Data

US 2006/0212851 A1 Sep. 21, 2006

(51) Int. Cl.
*G06F 9/44* (2006.01)
(52) U.S. Cl. .................. 717/126; 717/127; 717/130
(58) Field of Classification Search ............. 717/126, 717/127, 130, 162; 707/102, 104
See application file for complete search history.

(56) References Cited

U.S. PATENT DOCUMENTS

| | | | | | |
|---|---|---|---|---|---|
| 5,617,569 | A | * | 4/1997 | Gray et al. | 707/103 R |
| 5,663,721 | A | * | 9/1997 | Rossi | 341/51 |
| 5,696,925 | A | * | 12/1997 | Koh | 711/203 |
| 5,938,766 | A | * | 8/1999 | Anderson et al. | 713/100 |
| 5,960,087 | A | * | 9/1999 | Tribble et al. | 713/167 |
| 6,006,328 | A | * | 12/1999 | Drake | 726/23 |
| 6,049,838 | A | * | 4/2000 | Miller et al. | 719/315 |
| 6,138,269 | A | * | 10/2000 | Ball et al. | 717/108 |
| 6,141,723 | A | * | 10/2000 | Lyons | 711/6 |
| 6,212,632 | B1 | * | 4/2001 | Surine et al. | 713/2 |
| 6,345,313 | B1 | * | 2/2002 | Lindholm | 719/315 |
| 6,446,259 | B2 | * | 9/2002 | Brett | 717/165 |
| 6,584,478 | B1 | * | 6/2003 | Spertus | 707/206 |
| 7,007,159 | B2 | * | 2/2006 | Wyatt | 713/1 |
| 2006/0020936 | A1 | * | 1/2006 | Wyatt | 717/162 |
| 2006/0195617 | A1 | * | 8/2006 | Arndt et al. | 710/1 |

OTHER PUBLICATIONS

Gang Qu, "Publicly detectable techniques for the protection virtual components"Jun. 2001, ACM, DAC '01, pp. 474-479.*
Salles et al. "Security of Runtime Extensible Virtual Environments", Sep. 2002, ACM, CVE '02, pp. 97-104.*

* cited by examiner

*Primary Examiner*—Wei Y. Zhen
*Assistant Examiner*—Anna Deng
(74) *Attorney, Agent, or Firm*—Woodcock Washburn LLP (57) ABSTRACT

A method and system are provided that override constructors such that the constructors not only initialize objects but also provide notification about virtual pointers of the objects. This notification is provided to a list that stores which virtual pointers are created and where they are supposed to be pointing. By knowing the address of the virtual tables that the virtual pointers are supposed to be pointing to, a determination can be made whether the virtual tables are the correct virtual tables or whether they may be different virtual tables that have been substituted in by a hacker and that contain pointers to foreign code.

16 Claims, 7 Drawing Sheets

Overriding Constructor To Provide Notification 500

Fig. 1

Relationship of Virtual Pointers, Tables, and Functions 200

OVERRIDING CONSTRUCTORS TO PROVIDE NOTIFICATION IN ORDER TO DETECT FOREIGN CODE

CROSS-REFERENCE TO RELATED APPLICATIONS

This application relates to application Ser. No. 11/102,341, filed Apr. 8, 2005, entitled "System and method for foreign code detection," and application Ser. No. 11/156,126, filed Jun. 17, 2005, entitled "Post Build Process to Record Stack and Call Tree Information."

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

The present invention relates generally to the field of computing. More particularly, the present invention relates to detection of attempts to execute foreign code.

BACKGROUND

Computer systems today are subject to a variety of attacks that can disrupt or disable expected operation of a computer system and cause the system to behave in damaging or undesirable ways. Computer viruses, worms, and trojan horse programs are examples of different forms of attack. Attacks can also come from unscrupulous users of a computer system or remote hackers. Often these attacks take the form of attempts to modify existing program code executed by the computer system or attempts to inject new unauthorized program code at various stages of normal program execution within the computer system. Systems and methods for preventing such malicious attacks are becoming increasingly important.

Generally speaking, such attacks are implemented by causing the computer to execute foreign code. "Foreign" code, in this case, refers to code that is not intended or expected to execute in the process space of a particular program. It is typically written by a hacker to get into the process space of a program to accomplish some end, such as to delete, corrupt, or manipulate code or data for some other purpose, like unlawfully making unauthorized copies of music.

Preventing such attacks by foreign code assists in assuring the behavioral integrity of a computer system (or, at least, a particular program). One way to maintain integrity is to perform module authentication, in which the security of one or more software modules is protected against tampering. This provides a level of protection against malicious changes to the software such as code patching, redirection, and software breakpoints.

One form of module authentication is to ensure that content contained in the software module is unchanged (or, at least, that the portions of the module that are not expected to change, such as the code portions, actually remain unchanged). This may be done via static module authentication. Static module authentication is the process of verifying the persistently stored image of the module, which in some cases can be thought of as the "on-disk" module. For example, one mechanism to check the module on-disk may be accomplished by hashing the file and comparing the resulting hash value with a pre-computed hash value of the file that has been signed by a trusted signatory.

The process of hashing, is a well-known cryptographic technique for identifying data with a relatively unique, but substantially smaller representation than the original data. The hash can be taken on a binary source of arbitrary length, and the result of the hashing computation is a smaller, usually fixed-size piece of binary data known as a hash, hash value, or digest. For example, FIPS SHA-1 (Federal Information Processing Standards Secure Hash Algorithm 1) produces a 20-byte long hash regardless of the amount of data that is processed. A good hashing algorithm, like SHA-1, will produce significantly different hash values even for minute changes in the source data, or binary file in this case. Thus, when the expected attack is modification of the stored code, hashing is very effectively at allowing the modification to be detected.

However, not all attacks come in the form of modifications to the stored code. Some attacks are leveled without any modification to the program itself, but rather by modifying the runtime data in such a way that the program will jump into some foreign code created by a hacker, and then execute the foreign code in the program's address space. One way that a hacker might implement such an attack is through a function table associated with a particular type of object—i.e., if the object contains a pointer to a legitimate function table, the hacker can change the pointer to point to the hacker's own function table, which will then cause the program to jump into the hacker's own functions during the program's execution. Thus, it would be advantageous to guard against any kind of unwanted modification of such a pointer pointing to a table or the modification of the table itself. Specifically, it would be advantageous to guard against the changing of virtual pointers pointing to virtual tables, where the virtual tables contain pointers to virtual functions, and to guard against the modification of the virtual tables themselves.

SUMMARY OF THE INVENTION

A method and system are provided for detecting attempts to execute foreign code by overriding constructors in such a way that the constructors provide notification of when objects are created and where their virtual pointers are supposed to be pointing. In one aspect of the invention, the constructors are implemented in C++. These constructors may be overridden to provide an additional functionality separate from their primary purpose which is to initialize objects. When objects with references to virtual functions are initialized, virtual pointers of the objects are created and they point to some initial virtual tables that contain pointers to the virtual functions. The additional functionality of this aspect of the invention is a notification to a list about what virtual pointers are created and where they are supposed to point. By examining the list, a determination can be made whether the virtual pointers are pointing to the intended code or whether they are potentially pointing to foreign code.

In another aspect of the invention, the list of virtual pointers is verified by a module authentication functionality. This functionality can verify the virtual pointer list at specified periods of time or at random times. The verification entails examining which virtual tables the virtual pointers are pointing to. Virtual pointers that point to unintended virtual tables are classified as potentially pointing to foreign code.

BRIEF DESCRIPTION OF THE DRAWINGS

The foregoing summary, as well as the following detailed description of the invention, is better understood when read in conjunction with the appended drawings. In order to illustrate the invention, exemplary aspects of the invention are shown. However, the invention is not limited to the specific systems and methods disclosed. The following figures are included.

DETAILED DESCRIPTION OF ILLUSTRATIVE EMBODIMENTS

Overview

Aspects of the present invention allow for the use of constructors to not only initialize objects but also to provide notification information of objects' contents. In one aspect of the invention, C++ constructors provide a functionality that is additional to what constructors typically do, which is class instance initialization. This additional functionality is a notification to a data structure (such as a list), which contains information about what tables a class instance's virtual pointers are supposed to point to. An authentication module can examine the notification stored in the data structure and compare its contents to where virtual pointers happen to be pointing at some specified time. If the comparison reveals that the virtual pointers are pointing to the intended virtual tables, a conclusion can be reached that no foreign code has been introduced by means of a substitute virtual table. Conversely, if the virtual pointers are not pointing to the intended tables, foreign code may be responsible, and protective measures must be taken.

Exemplary Computing Environment

Figure 1:
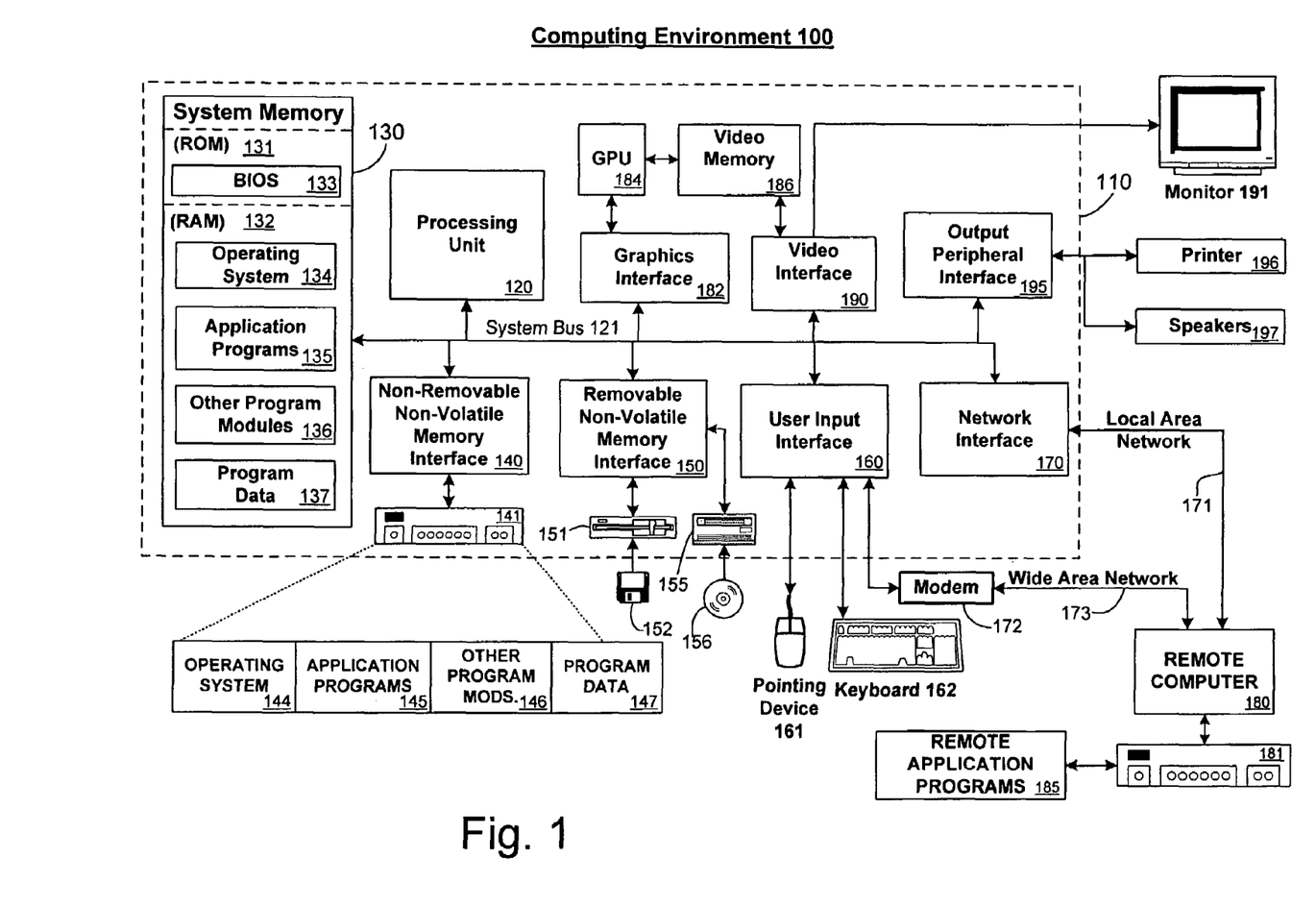
FIG. 1 provides a brief general description of a suitable computing device in connection with which the invention may be implemented.

FIG. 1 and the following discussion are intended to provide a brief general description of a suitable computing device in connection with which the invention may be implemented. For example, any of the client and server computers or devices illustrated in FIG. 1 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Aspects of Overriding the C++ Constructor to Provide Notification in Order to Detect Foreign Code A "constructor" is a well known concept in object-oriented programming languages. For example, in C++ a constructor is a function provided by a class in order to instantiate an object, that is, to name it and initialize it. A constructor has the same name as the class, and is typically accompanied by a destructor in the class, where the destructor destroys objects of the class.

In one aspect of the invention, the C++ constructor is overridden so that it can provide an additional functionality to that of instantiation, namely, that of notification of the state of objects. Specifically, since objects can contain virtual pointers, such notification provides information of when virtual pointers are created and the memory locations they point to. Virtual pointers, in this aspect of the invention, refer to pointers that point to virtual tables, where the virtual tables contain pointers to virtual functions of an object, where the virtual functions are bound dynamically (hereafter, for brevity's sake, referred to as "functions"). By overriding the standard C++ constructor with an augmented C++ constructor that provides this additional function of notification of virtual pointer creation and content, security of code and data is increased.

For example, by knowing which virtual table a virtual pointer is supposed to be pointing to, it is more difficult for a hacker to change the virtual pointer address such that the virtual pointer points to a hacker's virtual table, since such a change could be detected. If the virtual pointer could be changed to point to the hacker's virtual table, the pointers in this hacker table can point to hacker foreign code that might delete, corrupt, or otherwise modify code and data stored in memory, or otherwise cause a program to behave in unexpected and possibly damaging ways. Thus, maintaining a list of virtual pointers and guarding against their change by verifying that list, decreases the possibility of insertion of foreign code into a program through the virtual table, which in turn increases the security of code and data stored on a computer system.

Importantly, this aspect of the invention provides for the integrity of data. Code is typically easier to guard against manipulation by foreign code because it is not supposed to change. However, data is subject to change, and thus it is more difficult to ascertain whether the data stored in memory is the intended data. Virtual pointers have in them data in the form of addresses of the memory cells they are pointing to, namely, virtual tables. Preventing the alteration of such virtual pointer data prevents a hacker from changing the virtual pointer data to point to his hacker virtual table.

Figure 2:
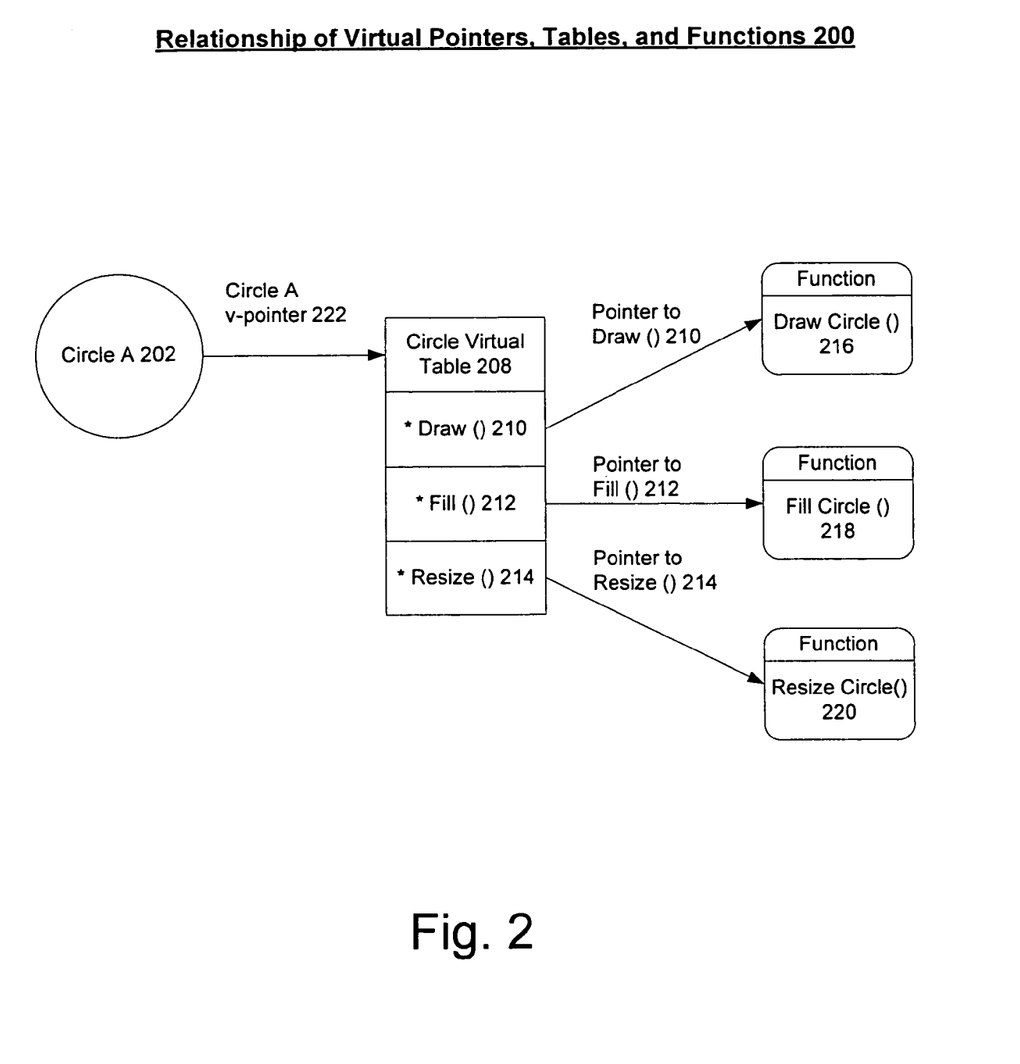
FIG. 2 illustrates example relationships of virtual pointers, tables, and functions.

FIG. 2 illustrates the relationship of virtual pointers, tables, and functions 200. It provides the context in which aspects of the invention can be implemented. A circle object, circle A 202, is illustrated. ("Circle object," in this context, means the object that contains the code and data needed to draw and modify a particular circle on a graphical display.) This object happens to be a circle, but it can be a variety of different shapes. The circle A object 202 contains a virtual pointer, namely, circle A v-pointer 222 that points to a circle virtual table 208.

The circle virtual table 208 lists pointers to functions that operate on a shape of type "circle". Specifically, the circle virtual table 208 can contain a pointer to the draw function 210, a pointer to the fill function 212, and a pointer to the resize function 214. These functions are used by its objects, in this case circle A 202, in order to draw circles 216, fill circles 218, and resize circles 220.

Figure 3:
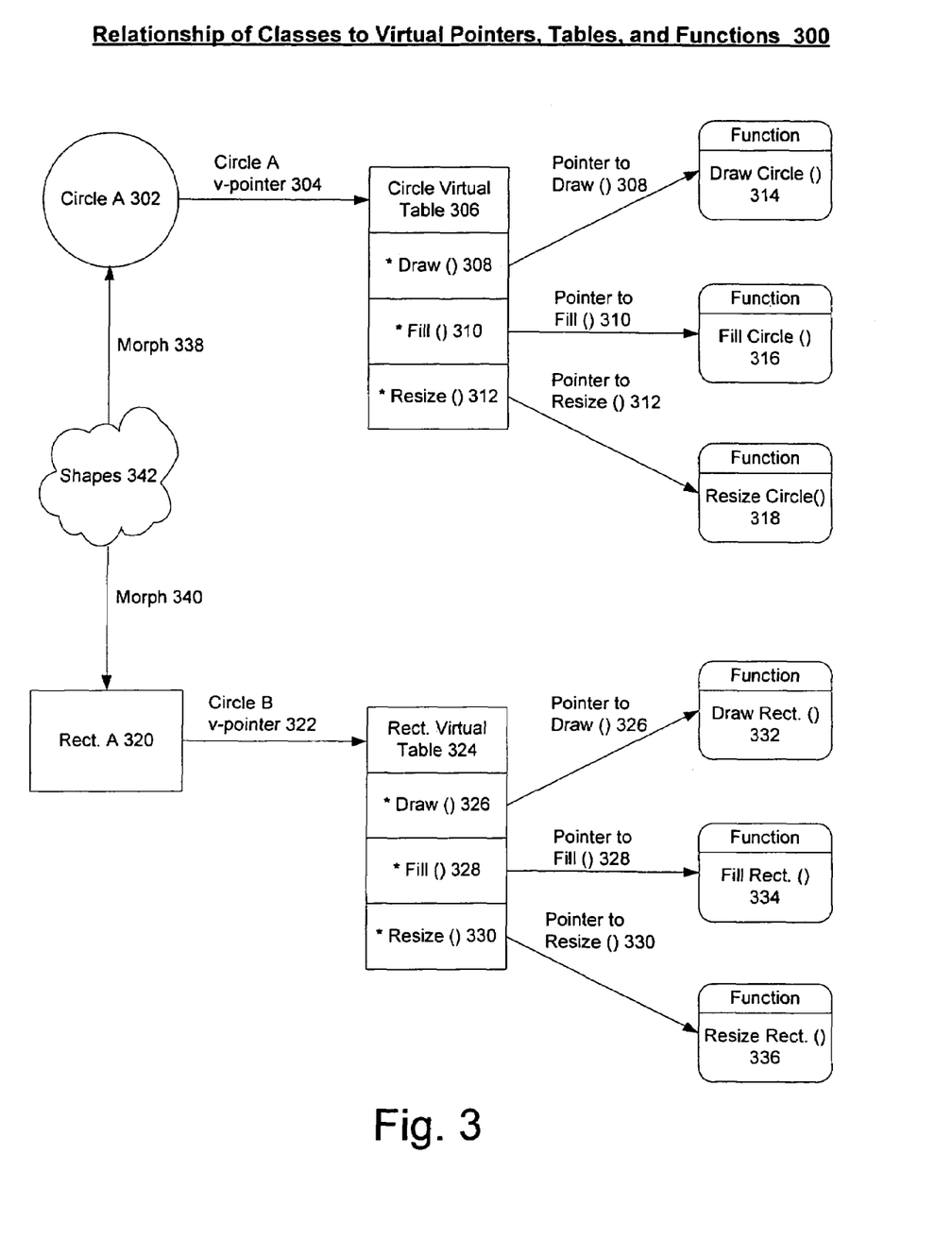
FIG. 3 illustrates example relationships of classes to virtual pointers, tables, and functions.

FIG. 3 further explains the context of the present aspect of the invention 300. In FIG. 3, through the idea of polymorphism, a class shape 342 can be morphed 338 and 340 and instantiated into some specific object, such as a circle A 302 or a rectangle A 320. Each of these objects has a virtual pointer to its respective virtual table. Specifically, circle A 302 has a virtual pointer 304 to the circle virtual table 306 and rectangle A 320 has a virtual pointer 322 to the rectangle virtual table 324. With respect to circle A 302, just as in FIG. 2, the circle virtual table 306 has pointers to functions, namely, pointers 308, 310, and 312 to functions draw circle 314, fill circle 316, and resize circle 318, respectively.

Likewise, rectangle A 320 has a rectangle virtual table 324 with pointers 326, 328, and 330 to functions that draw the rectangle 332, fill the rectangle 334, and resize the rectangle 336, respectively. What FIG. 3 shows is that all kinds of virtual pointers, whether they be pointers to circles, rectangles, other shapes, are considered for notification and verification purposes, as discussed above, by an aspect of the invention. The reason all these virtual pointers are important to monitor is illustrated in the next figure where foreign code may be injected in order to delete, corrupt, or otherwise damage code and data in a computer system.

Figure 4:
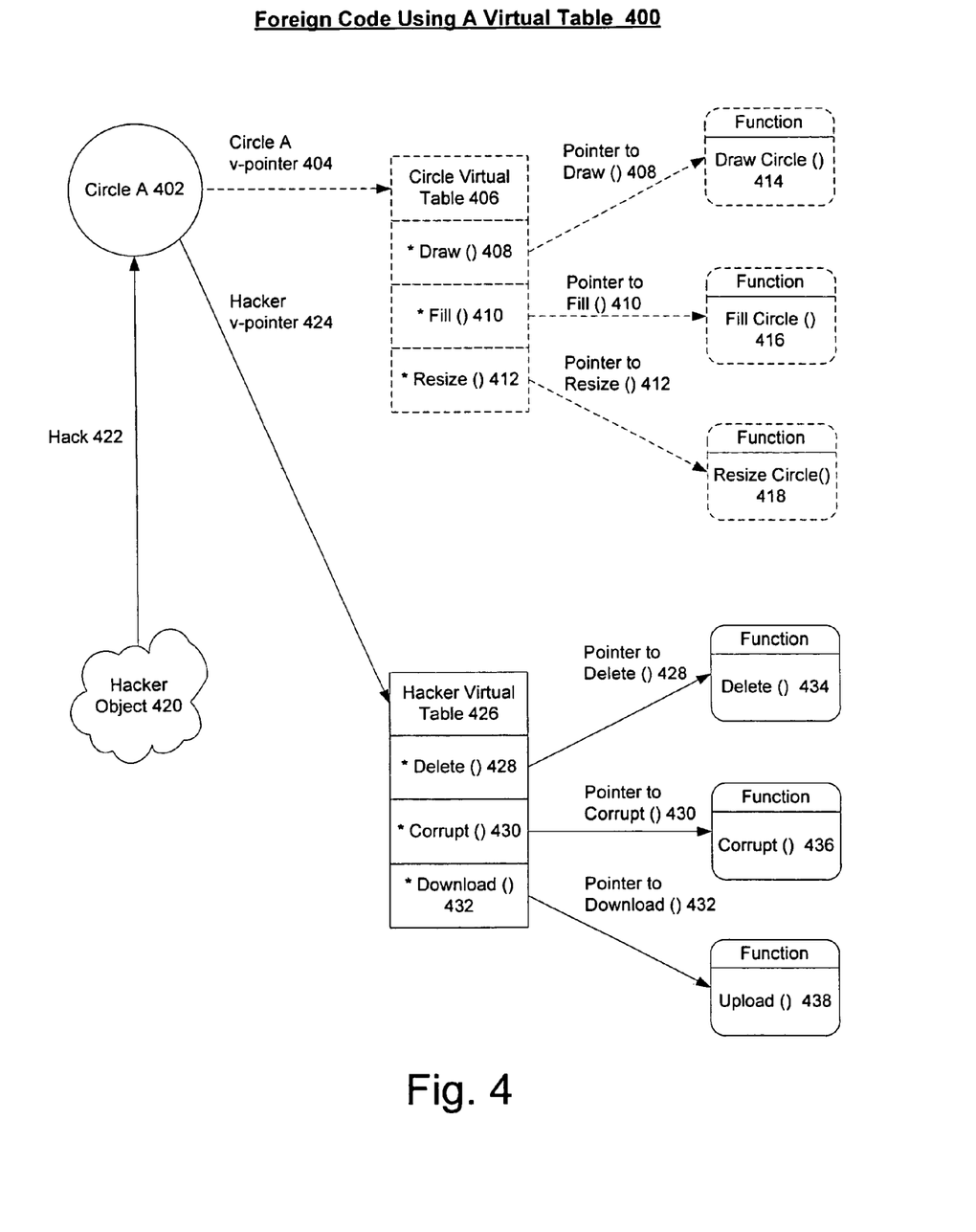
FIG. 4 illustrates an example of foreign code using a hacker virtual table.

FIG. 4 shows the employment of foreign code using a hacker virtual table 400. A hacker object 420 performs a hack 422 on the circle A 402 object. Circle A 402 is the same circle A discussed in FIGS. 2 and 3. After the hack 422 is performed, circle A virtual pointer 404 no longer points to the circle virtual table 406 (nor to the associated functions, 414, 414, and 418), but rather a hacker virtual pointer 424 points to a hacker virtual table 426.

Hack 422 will be successful if the fact that circle A's virtual pointer 404 has been changed to point to table 426 instead of table 406 can escape detection. A goal of the present invention is to detect such a change so that remedial action can be taken before the hacker's virtual table 426 is actually used to jump into the hacker's code. In FIG. 4, the circle virtual table 406 and its associated functions 420, 422, and 424 are illustrated in dashed lines to show that these operations are no longer active, and that the circle A 402 virtual pointer no longer points them, but instead points to the hacker virtual table 426 and functions 434, 436, and 438.

Instead, the hacker virtual table 426 is active, and it may contain pointers 428, 430, and 432 that point to foreign code in the form of functions, such as, a delete function 434 that may delete code or data on a computer system, a corrupt function 436 that may do its nominal damage, and an upload function 438 that may upload a user's personal data without his authorization or knowledge. By hacking a virtual pointer 404 in circle A 402 and hence substituting the hacker virtual table 426 for the original circle virtual table 406, foreign code may be invoked and executed, undermining a computer system's integrity and security.

Figure 5:
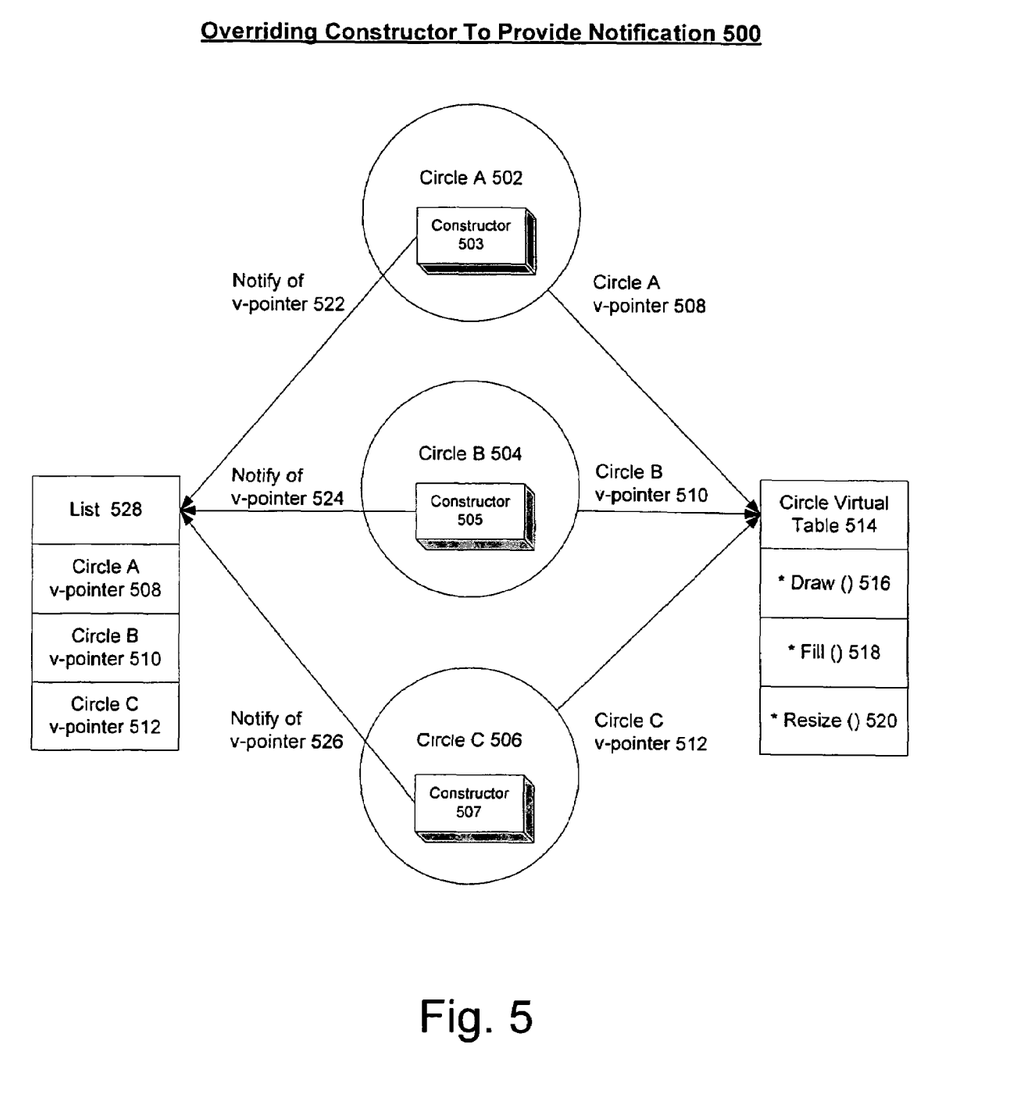
FIG. 5 illustrates how a constructor may be overridden to provide notification of virtual pointers in objects.

FIG. 5 shows how a constructor may be overridden so that it provides notification 500 to a data structure, such as a list, when an object and its attributes, namely virtual pointers, are created. By way of background, a typical constructor is an initializing function that allocates memory for an object and is able to initialize the object's data to particular values. A class can have more than one constructor. A constructor is a member function of a class and it is implicitly invoked whenever a class instance is created. The constructor has the name of the class itself. A default constructor for a circle class might be expressed as follows:

circleClass( );

A default constructor by definition has no arguments, and typically a default constructor initializes data members to values that are chosen. For example, the following constructor may initialize the radius of a circle to the value of 3.14:

```
circleClass :: circleClass( ) : Radius(3.14)
{
    // default constructor
}
```

In addition to initializing data members, the constructor can be also overridden to notify when virtual pointers are created and where they are pointing. For example, the following is a template function that might be implemented:

```
circleClass :: circleClass( ) : Radius(3.14)
{
    // default constructor
    // notification of virtual pointer creation
}
```

The constructor for circleClass now not only initializes the radius of the circle to 3.14, but also invokes a Virtual_Pointer_List( ) function to update a list when a virtual pointer is created, notifying the list where the virtual pointer is pointing.

In reference to FIG. 5, Circle A 502 object is created and a virtual pointer 508 points to a circle virtual table 514. The circle virtual table 514 contains pointers to functions, such as a pointer to a draw function 516, a pointer to a fill function 518, and a pointer to a resize function 520 (the functions themselves are not shown here, but can be seen by analogy in FIG. 4).

When the circle A 502 object is created, its constructor 503 notifies 522 a list 528 that circle A 502 has a particular virtual pointer 508. Similar logic holds true for circle B 504 and circle C 506: circle B 504 has its constructor 505 notify 524 the list 528 that a virtual pointer 510 was created; circle C 506 has its constructor 507 notify 526 the list 528 that a virtual pointer 512 was created. Each object that gets created, whether a circle or other type of object, has its constructor notify the list 528 when a virtual pointer is created.

Such notification allows for the monitoring of virtual pointers. Monitoring virtual pointers, as mentioned with reference to FIG. 4, prevents a hacker from substituting his own hacker virtual table for an intended and legitimate virtual table. This aspect of the invention provides for ensuring that not only a genuine table is pointed to, but also that the intended table is pointed to by the virtual pointer. In other words, it could be the case that a hacker substitutes one genuine table for another genuine table by changing the virtual pointer in order to perform a desired hack. However, by knowing which virtual pointer is intended to point to which table, the hacker can be stopped.

Figure 6:
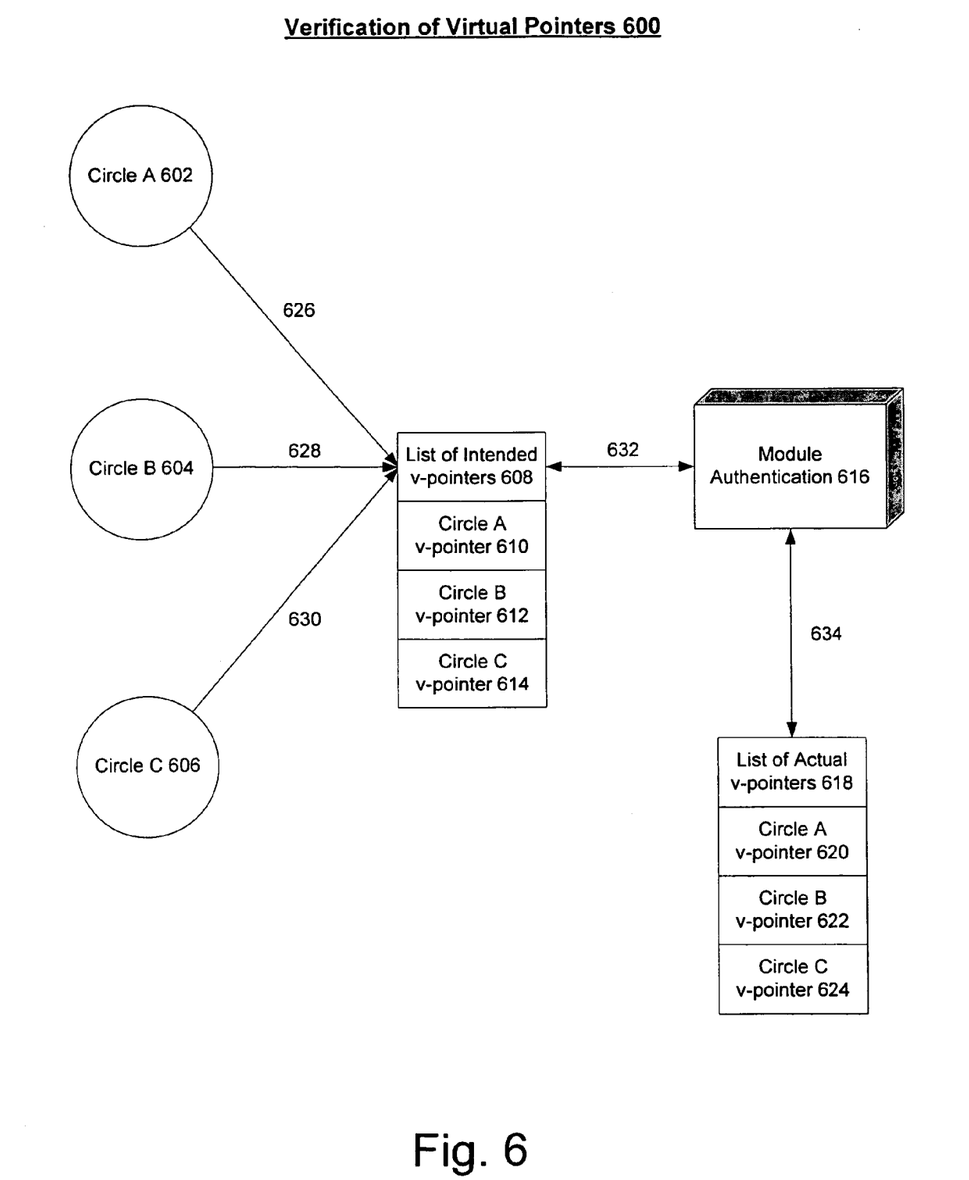
FIG. 6 illustrates an example verification of virtual pointers based on a lists of virtual pointers.

In another aspect of the invention, in FIG. 6, verification of the intended virtual pointers is illustrated 600. For example, three generic circle objects 602, 604, and 606, notify 626, 628, and 630 a list 608 of virtual pointers and where these pointers are supposed to be pointing. The list contains virtual pointers corresponding to the circle objects, namely, virtual pointers 610, 612, and 614, respectively. As mentioned above, this notification is done by using class constructors. After a list 608 is compiled, it can be examined 632 by a module authentication functionality 616 and compared 634 to where the virtual pointers are actually pointing to, namely, list 618, containing virtual pointers 620, 622, and 624.

Specifically, the module authentication functionality 616 can compare the circle A virtual pointer 610 in the intended list 608 to the circle A virtual pointer 620 in the actual list 608. If virtual pointers 610 and 620 point to the same virtual table, i.e., if the intended and actual memory address contained in the pointer memory cell is the same, then the module authentication functionality 616 knows that no hack has been performed that resulted in a change to the virtual pointers. However, if on the other hand, there is a discrepancy between the two virtual pointers 610 and 620, a hack may have been performed. Likewise, the authentication module performs the same examination and comparison analysis for the remaining virtual pointers in tables 608 and 618, namely, comparing circle B virtual pointer 612 in the intended list 608 to the circle B virtual pointer 622 in the actual list 618; and comparing circle C virtual pointer 614 in the intended list 608 to the circle B virtual pointer 624 in the actual list 618. All items in the lists can be compared for all objects.

Figure 7:
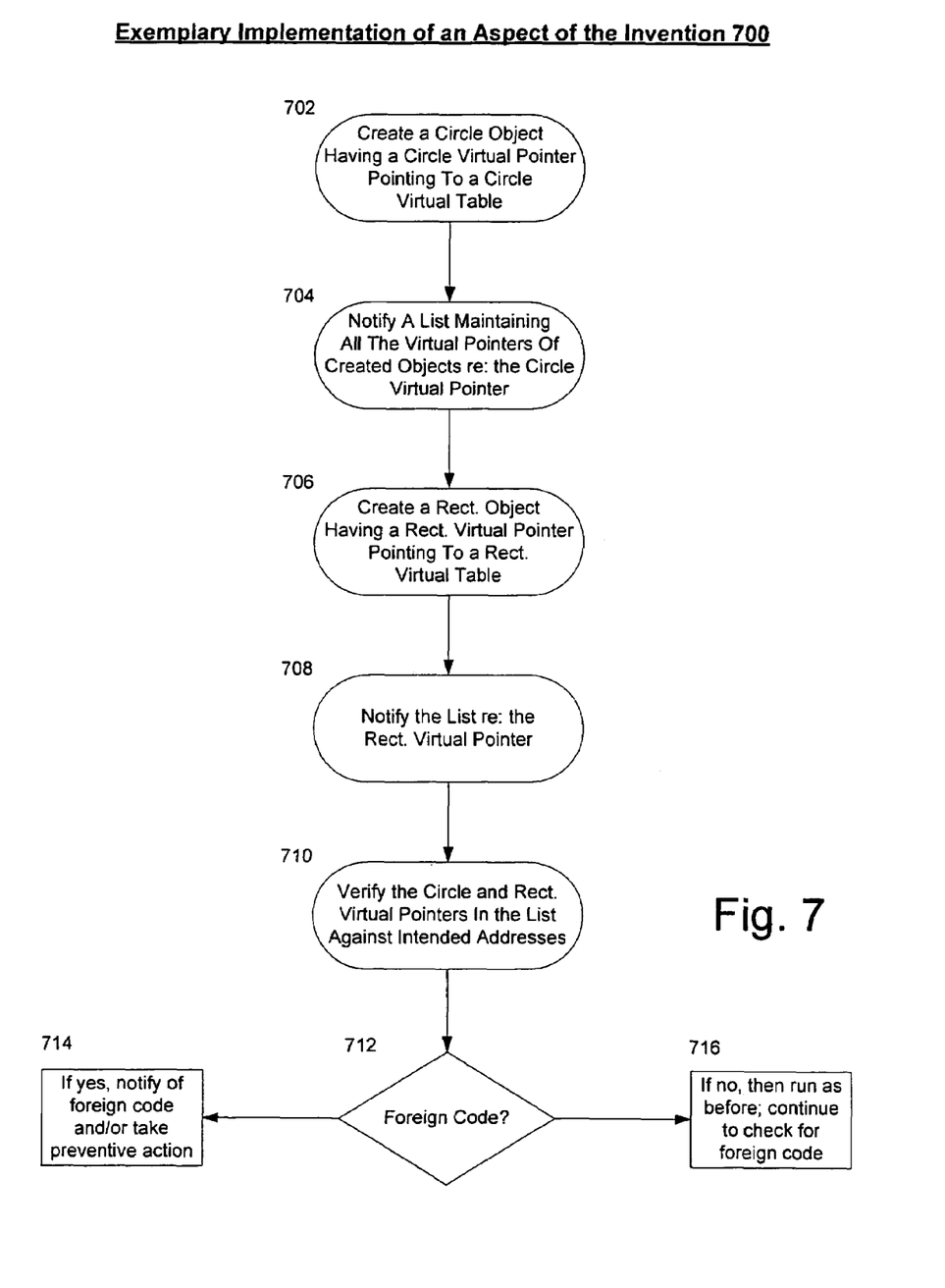
FIG. 7 illustrates an example implementation of an aspect of the invention.

In yet another aspect of the invention, FIG. 7 illustrates one example of a process of carrying out the invention 700. First, at block 702, a circle object is created, where the circle object contains a virtual pointer pointing to a virtual circle table. At block 704, the circle object notifies a list maintaining a list of virtual pointers that the object was created and where its virtual pointer is intended to point. As mentioned above, the notification is performed by using a constructor which has been overwritten to provide such notification.

At block 706, another object is created. This time it is a rectangle object that also has its own rectangle virtual pointer, pointing to a rectangle virtual table. At block 708, just as in block 704, above, the list gets updated with the information that the rectangle virtual pointer was created and where it is supposed to be pointing. At some point in time, at block 710, these virtual pointers on the list get verified. They may be verified periodically or randomly, when only some objects are created or when all objects are created. The time at which notification and verification of the virtual pointers is performed is a performance issue and will vary depending on the available resources.

Once the verification at block 710 is performed, at block 712, either foreign code will be found or it will not be found. If it is found, at block 714 the module authentication can perform a notification action to another module or process, terminate the entire process altogether, corrupt the stack to cause an unpredictable crash, or simply replace any modified data. If, on the other hand, foreign code is not found, at block 716, the program continues to run as before and the process of notification and verification of virtual pointers continues as before.

While the present invention has been described in connection with the preferred aspects, as illustrated in the various figures, it is understood that other similar aspects may be used or modifications and additions may be made to the described aspects for performing the same function of the present invention without deviating therefrom. For example, in one aspect of the invention, a C++ constructor is overridden in order for the constructor to provide notification of the intended addresses that virtual pointers are supposed to be pointing to, thus providing an additional functionality to instantiating objects. However, other equivalent devices to this aspect of the invention are also contemplated by the teachings herein. Therefore, the present invention should not be limited to any single aspect, but rather construed in breadth and scope in accordance with the appended claims.

What is claimed is:

1. A system of protecting the integrity of at least one virtual pointer against foreign code, wherein said system is stored on a computer readable memory, comprising:

a constructor for instantiating an object;

a data structure, wherein the constructor provides a notification to the data structure about the at least one virtual pointer which is associated with the object, wherein the at least one virtual pointer points to a virtual table; and wherein said notification includes information regarding when said at least one virtual pointer is created and to where it is pointing;

a verifying module, wherein the verifying module verifies at some point after the notification that the at least one virtual pointer is still pointing to the virtual table;

wherein the verifying module verifies at least partly based on the notification provided to the data structure;

wherein the verifying module verifies that the at least one virtual pointer is still pointing to the virtual table at specified periods of time, wherein a frequency of verifying by the verifying module is a function of computing resources;

wherein the verifying module takes at least one protective action if the at least one virtual pointer is no longer pointing to the virtual table;

the at least one protective action includes performing a notification action to another module or a process that the virtual pointer is no longer pointing to the virtual table;

the at least one protective action includes terminating execution of a process associated with the virtual pointer, or corrupting a stack associated with the virtual pointer; and the at least one protective action includes replacing the virtual pointer to point to the virtual table again.

2. The system according to claim 1, wherein the data structure is a list.

3. The system according to claim 1, wherein the constructor is an object-oriented language function, wherein the object-oriented language includes C++.

4. The system according to claim 1, wherein the virtual table contains at least one pointer to at least one virtual function.

5. A computer implemented method of monitoring the state of virtual pointers against foreign code, comprising:

creating an object, wherein the object has a constructor for instantiating the object, and wherein the object has at least one virtual pointer pointing to a virtual table;

providing information about the at least one virtual pointer to a data structure, wherein the constructor in addition to instantiating the object also provides the information about the at least one virtual pointer;

wherein said information includes information regarding when said at least one virtual pointer is created and to where it is pointing;

determining at some point after the object is created whether the at least one virtual pointer is still pointing to the virtual table by accessing in the data structure the information about the at least virtual pointer;

wherein said determining includes verifying that the at least one virtual pointer is still pointing to the virtual table at specified periods of time, wherein a frequency of verifying is a function of computing resources;

taking at least one protective action if the virtual pointer is not pointing to the virtual table anymore;

the at least one protective action includes performing a notification action to another module or a process that the virtual pointer is no longer pointing to the virtual table;

the at least one protective action includes terminating execution of a process associated with the virtual pointer, or corrupting a stack associated with the virtual pointer; and the at least one protective action includes replacing the virtual pointer to point to the virtual table again.

6. The method according to claim 5, wherein the information includes the memory address of the virtual table contained in the memory cell of the at least one virtual pointer.

7. The method according to claim 5, wherein the data structure is a list.

8. The method according to claim 5, wherein a module authentication functionality determines whether the at least one virtual pointer is still pointing to the virtual table.

9. A computer implemented method for increasing the security of code and data by protecting virtual pointers against unwanted modification by foreign code, comprising:

storing information about a virtual table into a data structure, wherein the information is stored by a constructor upon instantiation of a class instance associated with the virtual table;

comparing a virtual pointer of the class instance to the information about the virtual table, at a specified time after the instantiation of the class instance, in order to determine whether the virtual pointer is pointing to the virtual table;

wherein a frequency of the comparing is performed as a function of computing resources;

wherein information is stored in the data structure regarding when the at least one virtual pointer is created and to where it is pointing;

continuing the execution of a program containing the class instance if the virtual pointer is pointing to the virtual table;

taking at least one protective action if the virtual pointer is not pointing to the virtual table;

the at least one protective action includes performing a notification action to another module or a process that the virtual pointer is no longer pointing to the virtual table;

the at least one protective action includes terminating execution of a process associated with the virtual pointer, or corrupting a stack associated with the virtual pointer; and the at least one protective action includes replacing the virtual pointer to point to the virtual table again.

10. The method according to claim 9, wherein the virtual table is a table that contains a list of pointers to virtual functions which are bound dynamically.

11. The method according to claim 9, wherein the information about the virtual table includes a memory address of the virtual table.

12. The method according to claim 9, wherein the virtual pointer contains a memory address of the virtual table upon the instantiation of the class instance.

13. The method according to claim 9, wherein the data structure is a list.

14. The method according to claim 9, wherein the constructor is a member function of the class instance that is implicitly invoked when the class instance is created.

15. The method according to claim 9, wherein the constructor, the virtual table, the virtual pointer, and associated constructs are implemented in C++.

16. The method according to claim 9, wherein the frequency of comparing the virtual pointer of the class instance to the information about the virtual table is a function of the performance of the program.

* * * * *